Patented May 17, 1949

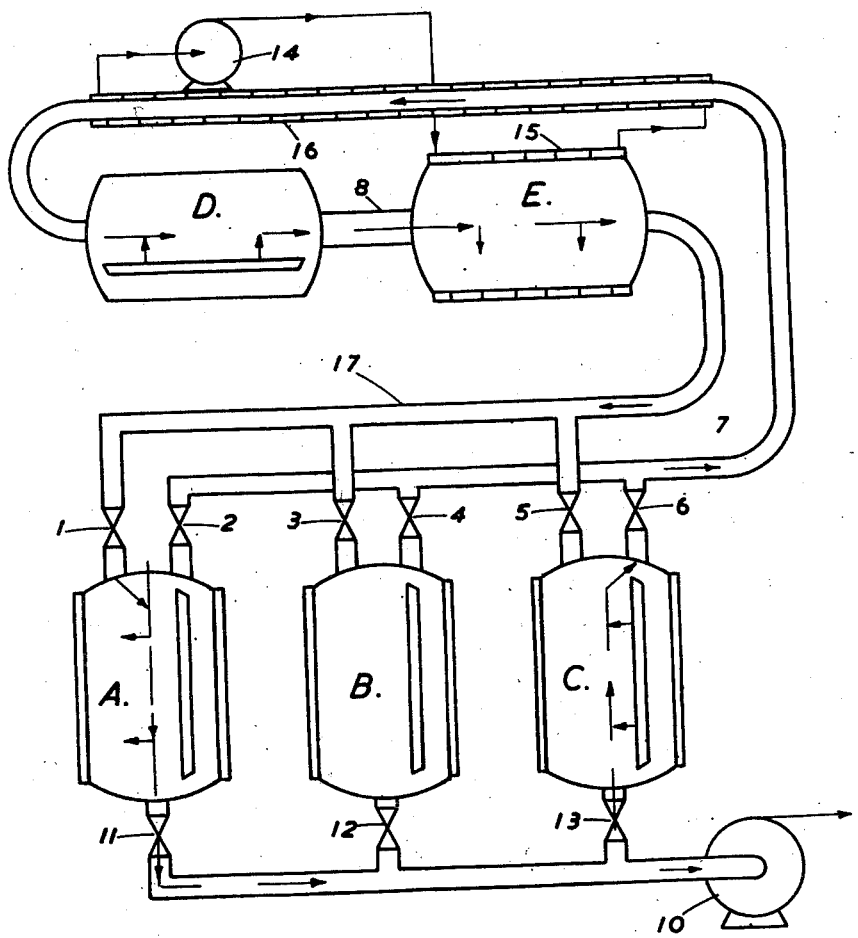

2,470,305

UNITED STATES PATENT OFFICE 2,470,305

PROCESS FOR THE PRODUCTION AND REFINING OF ALUMINIUM

Philipp Gross, Slough, England, assignor to International Alloys Limited, Slough, England, a body corporate of Great Britain Application April 18, 1945, Serial No. 589,093
In Great Britain April 19, 1944

16 Claims. (Cl. 75—68)

This invention provides an improved distillation process for producing or refining aluminium.

It has previously been suggested that aluminium can be distilled when in intimate mixture with a solid halide, such as aluminium fluoride, magnesium fluoride or cryolite, at temperatures far below those at which it can be practically distilled at any appreciable rate by heat alone, i. e. when not mixed with a halide.

Based on this suggestion a process of producing or refining aluminium has been proposed which comprises forming an intimate solid mixture containing a halide and aluminium or aluminium bearing material, heating the mixture in an atmosphere effectively inert to aluminium to vaporize therefrom metallic aluminium and halide, condensing the vapours, and separating the aluminium from the condensate which consists of a mixture of halide and aluminium. Halides which are unstable at the temperature of operation or which vaporize readily at that or lower temperatures, thus leaving the reaction zone impoverished in halide prior to effective reaction, are not desirable in practising this process.

Further, it has been found (W. Klemm and E. Voss, Zeitschrift fur anorg; und alligemeine Chemie, vol. 251 pages 232–40 (1943)) that when the condensate obtained from the distillation at about 700° C. of aluminium mixed with aluminium fluoride, which condensate consists of a very intimate mixture of aluminium and aluminium fluoride, is repeatedly submitted to re-distillation the end condensate is of the molecular composition of 2Al to 1AlF$_3$. From this it has been deduced that the volatility of aluminium when mixed with aluminium fluoride is based on the formation of an aluminium mono fluoride which is more volatile than either of them.

As distinct from the foregoing is has been established according to the present invention that vapours of halides previously brought to the vapour phase react with aluminium at temperatures far below the temperatures at which aluminium would distil due to its vapour pressure, to form unstable volatile reaction products that by cooling, gradually lead to the condensation of aluminium and the original or other stable halide. The aluminium is heated either in an atmosphere containing only the vapour of the halide or halides (then preferably under reduced pressure or partial vacuum) or containing these vapours mixed with a gas [or gases] inert to aluminium, such as hydrogen. In a similar manner aluminium volatilizes from materials containing available aluminium, such as AlFe or aluminium carbide.

According to the present invention and contrary to previous teaching, low boiling or subliming halides such as aluminium chloride (sublimation point at normal pressure 180.2° C.) or aluminium bromide (boiling point at normal pressure 256.4° C.) can be used with advantage though high boiling or subliming halides such as aluminium fluoride (sublimation point at normal pressure 1260° C.) have been found effective.

Dependent on the halide used and on the conditions of heating and cooling the halide condenses either together with the aluminium or separated from it, or not at all. If the temperature of volatilization of the halide at the pressure maintained in the system is either the same as, or not much below, the practicable reaction temperature, the aluminum condenses either completely or partly with the halide and must afterwards be separated from it. If, however, the temperature of effective reaction is sufficiently above the temperature of evaporation of the halide under the conditions prevailing in the system, the aluminum condenses at a temperature sufficiently above the condensation temperature of the halide and therefore entirely or mostly separated from it in the hottest zone of the condenser, or if the condenser and pertaining parts of the apparatus are kept between the two condensation temperatures, the halide does not condense at all, thus leaving the halide vapor available in the system for continuous reaction. Entirely separate or no condensation of the halide at all can easily be achieved with aluminum chloride or bromide. The temperature of reaction of these halides is much higher than their temperature of evaporation.

Halides, the vapors of which if used at the temperature of their evaporation under the pressure in the system, give a practically too low yield of aluminum, such as sodium chloride or potassium chloride behave also similarly to aluminum chloride or bromide if they are used as sufficiently unsaturated vapors, i. e. if their pressure when contacted with the aluminum bearing material is sufficiently below their vapor pressure at reaction temperature. Under these conditions the yield is increased manifold and nearly all of the aluminum condenses separately from the halide. For this reason the expression "low boiling or subliming halides" is intended to include these halides.

When passing the halide vapour over the heated aluminium or material containing available aluminium the speed and partial pressure of the halide and the surface area and temperature of the material can be so regulated as to distil what appears to be a maximum amount of aluminium in relation to the halide used. The rate of volatilization of the aluminium within these limits i. e. as long as it is below the maximum amount in relation to the rate of the halide vapour stream, is greatly increased—other conditions remaining constant—by increasing the specific surface area and the temperature of the aluminium bearing material.

It appears that this behaviour—though the following explanation is theoretical and the invention is not limited by it—can be explained on the assumption that at the temperature of the reaction an equilibrium is established between the aluminium or the material containing available aluminium, the vapours of the original halide and of an unstable lower aluminium halide or aluminum halogen compound which, on cooling, gradually converts to the original or other stable halide and aluminium metal; though by cooling rapidly very little of a condensate has been obtained together with the aluminium which could not be identified as such and which appeared to be unstable and to undergo a change after which the analysis showed only aluminium and stable halide.

Thus, with aluminium chloride, which has proved very satisfactory, the reaction would be:

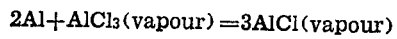

With a complex halide, such as cryolite, the reaction would be:

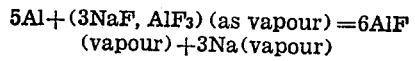

As the formation of the unstable aluminium monohalide or aluminum halogen compound absorbs heat, being strongly endothermic, and proceeds under increase of volume, the reaction will be the more complete the higher the temperature and the lower the pressure or, if the halide is admixed with an inert carrier gas such as hydrogen, the lower its partial pressure (concentration). The absolute amount of monohalide per unit of volume in the gas mixture (i. e. the concentration of volatilized aluminium) decreases with decreasing concentration of the original halide. A practical lower limit of its pressure (concentration) is given by the too small amounts of aluminium distilled at too low halide pressure.

As the reaction nears completion, thus giving higher efficiency, with increasing reaction temperature and decreasing halide pressure and as the rate of reaction increases with temperature it is advisable to keep the reaction temperature higher than the temperature of evaporation of the halide under the conditions prevailing in the system. This difference between the temperature of evaporation and the temperature at which the reaction is advantageously carried out is, as already mentioned, very great with aluminium chloride or bromide, but is also quite appreciable in other cases, for instance, 300° C. to 400° C. dependent on the conditions, with sodium chloride. It is, however, in accordance with the equilibrium considerations, in general most economic to be content with an efficiency of less than 90 p. c. If attempts at higher efficiency are made, a relatively high rise in temperature brings about only a relatively small increase of efficiency. Similarly, the practical lower limit of the temperature which depends on the nature of the halide used and the material containing the available aluminium, is limited by the too low efficiency and too low rate of reaction at too low temperatures.

The process of producing or refining aluminium according to the present invention consists in reacting heated aluminium bearing materials with a halide brought to the vapour phase previous to its contact and reaction with the aluminium bearing material whereby the aluminium volatilizes under formation of unstable aluminium halogen compound vapours and recovering the aluminium from the reaction products. It is preferable to contact the aluminium bearing material with halide vapour in an unsaturated condition, i. e. with halide vapour of a pressure or partial pressure which is lower than the vapour pressure of the halide at the temperature of contact. This can be achieved, for instance, by keeping the pressure in the system practically constant and the reaction temperature above the temperature of the evaporation of the halide or by allowing for expansion or dilution of the halide vapour from the place of evaporation to the place of reaction at practically equal temperature between these two places or by combining these two measures.

The expression "aluminium bearing material" is intended to include impure aluminium or aluminium alloys such as aluminium silicon, as well as compounds such as high ferro aluminium (AlFe) and aluminium carbide and mixtures of these compounds with aluminium and aluminium alloys. It may also include pure or raw alumina or other aluminium ore together with suitable reducing agents such as carbon or silicon or the mixtures of such aluminium bearing materials as have been mentioned and their mechanical mixtures with other materials.

The expression "halide" is intended to include the chlorides, fluorides and bromides of the alkali metals, of alkaline earth metals, and of aluminium, including the various complex salts which these halides form among themselves and such substances which form one or more of these halides with the aluminium bearing material, such as chlorine or hydrogen chloride or mixtures of two or more such materials.

Low boiling or subliming halides, such as aluminium bromide, and because of its lower price especially aluminium chloride, have been found effective and advantageous, since inter alia they condense, if at all, separately from the aluminium. The halide or halides may be evaporated in the chambers containing the aluminium bearing material or in different chambers and the evaporation may be effected under normal, reduced or slightly elevated pressure or it may be effected by passing an inert gas or gas mixture through or over the halide.

According to the aluminium bearing material and halide used the unstable aluminum halogen compound vapours are either the only gaseous reaction products or they are formed together with other gases or vapours, such as sodium vapour or carbon-monoxide. The method of recovering the aluminium must be chosen accordingly.

In practising the invention the aluminium bearing material is preferably brought into a condition in which it presents a high specific surface to the halide or halide containing vapour. In the molten state it may be contained in heated flat containers or dishes or spread over heated broken materials, placed in chambers which are filled with the halide vapour (preferably under reduced pressure) or with a mixture of the halide vapour and inert gases such as hydrogen, the said chambers being connected with suitable condensers to condense the aluminium or the aluminium and the halide. The aluminium may drop through towers filled with broken material or plate towers or pipes that are connected with a condenser, through which towers the halide vapour or gas mixture is passed under normal slightly elevated or reduced pressure. Halide vapour or halide vapour containing gas may also be bubbled through the liquid aluminium bearing material, passing then through a condenser to condense the aluminium or the aluminium and halide.

If the aluminium bearing material is solid at the temperature of reaction, it is preferably broken into small pieces or coarse powder, in the latter case preferably compressed to porous briquettes and placed in the said reaction chamber (or towers) where it is contacted or swept by the halide vapour or halide vapour containing gas.

Alternatively, the aluminium bearing material may be blown as a spray into the reaction chamber by the halide vapour or the halide vapour containing gas, whereby solid or liquid residues settle to the bottom of the reaction chamber or separate chambers kept at appropriate temperatures whilst the reaction vapours are led into suitable condensers to condense the aluminium. When low boiling or subliming halides are used the halide vapour may not be condensed at all. Then, when the reaction takes place in a static system (preferably under reduced pressure) this may be achieved simply by keeping every part of the whole system, including the condenser for the aluminium, above the condensation temperature of the halide. However, a stream of the halide vapour or halide containing gas may be led through the condenser to condense the aluminium only and then be re-circulated, by suitable pumping arrangements, over the aluminium bearing material. When low boiling or subliming halides are used and the halide vapour is condensed in the operation of the process, it is preferable to provide at least two halide condensers, each of which can be used alternately as condenser and evaporator. By using simultaneously one (or one set) as condenser and another one (or set) as evaporator, a great amount of aluminium can be distilled or even a continuous distillation of aluminium can be performed with a very limited amount of halide.

In every case when using low boiling or subliming halides, the heat generated by the condensation of the aluminium may be utilised to evaporate the halide if condensed and/or to preheat a halide vapor.

Reference will now be had to the accompanying drawing where apparatus for carrying out the process with low boiling or subliming halides is diagrammatically illustrated and wherein A, B and C represent chambers for selectively evaporating and condensing the halide alternatively according to the setting of the cocks or valves 1 and 2 for the chamber A, 3 and 4 for the chamber B and 5 and 6 for the chamber C. The valves 2, 4 and 5 connect their respective chambers with a conduit 7 leading to a chamber D maintained at a temperature sufficient to evaporate aluminium from the aluminium bearing material, and the gaseous halide and aluminium pass from thence through a conduit 8 to a condenser E, the temperature of which is below that in the evaporator D, but above the sublimation temperature of the halide so that aluminium is caused to condense in the condenser E separately from the halide vapour.

10 represents a vacuum pump connected to the chambers A, B and C through valves 11, 12 and 13 respectively and 14 is a circulating pump for a heat exchange medium circulating through a jacket 15 for the aluminium condenser E and a jacket 16 for the conduit 7 leading to the evaporator D so as to preheat the halide vapour passing to such evaporator.

From the aluminium condenser E a conduit 17 connects with the chambers A, B and C through the valves 1, 3 and 5 aforementioned.

With the valves 2, 3, 4, 5, 12 and 13 closed, and the valves 1, 6 and 11 open, and the chamber C containing two thirds of the halide within the cycle and at evaporation temperature, the chamber A containing the remaining one third of the halide and cold, and finally the chamber B containing no halide and cooling, the halide in C evaporates and the gaseous halide passes through the open valve 6, along conduit 7, through preheater 16, to the aluminium evaporator D, and thence with the volatolised aluminium through conduit 8, to the condenser E where the aluminium is condensed from the vapour and the halide continues along the conduit 17, through the open valve 1, into the chamber A which, being below the sublimation temperature of the halide effects its condensation therein.

The chamber B is not used until chamber A contains two thirds of the halide within the cycle, and the chamber C only one third of such halide, whereupon the valves 1 and 11 are closed and the valves 3 and 12 opened, so that chamber B which is now cooled, is used as condenser. The heating of chamber A is commenced simultaneously.

When chamber C is empty, chamber B contains only 1/3 of the halide in the cycle and is cold, whereas chamber A containing 2/3 of the halide has reached evaporation temperature. By then closing the valve 6, and opening valve 2, the evaporation of halide is transferred to A without interruption. At this time chamber C is allowed to cool.

Since chamber A is now at evaporation temperature and contains two thirds of the halide, while chamber B is cool and contains one third of it, and as chamber C is empty and cooling, the situation after this first period is similar to that which obtained during such period, with the exception that chamber B has taken over the function of chamber A, the latter has taken over the function of C, and chamber C has taken the function of B.

The rotation is then continued so that after two more changes of function, at the end of the second and third periods respectively, the situation will be in every respect exactly the same as in the beginning of the first period, and a new cycle of three periods will be commenced.

An advantage of the present invention is that mechanical operations on the halide such as the grinding and pressing into briquettes are not necessary; even the aluminium bearing material may be introduced into the distillation chamber in many cases originally in bulk.

Another advantage of the present invention is that there is an appreciable saving in the amount of halide that must be evaporated for each part of aluminium. For instance, when the vapour of aluminium fluoride (which may be easily evaporated at about 750° C. under reduced pressure) was passed over droplets of impure aluminium kept in position in a tower fitted with crystalline high alumina at a temperature of about 1000° C. the amount of aluminium fluoride used to distil one part of aluminium was about 1.6 parts, whereas, when distilling from a briquette pressed from impure aluminium and the solid fluoride, three parts of the fluoride were required for each part of aluminium.

More advantages of the present invention when low boiling or subliming halides are used arise from the fact that the halide condenses separately from the aluminium and these are:

(a) No separation, mechanical or otherwise, is necessary after distillation.

(b) The waste heat recuperated from the aluminium condenser can be used to evaporate the halide if condensed and to preheat the vapour.

(c) The quantity of halide contained in the system can be greatly reduced in ratio to the aluminium to be distilled in one operation, wherefrom a reduction in the size of the apparatus for the distillation of a given amount of aluminium or even a continuous distillation results. For that purpose the halide vapor is either kept as such in the reaction chamber or recirculated into it by means of a circulating pump adapted to work at elevated temperatures, say 120° C., when aluminium chloride is used at 1/100th. atmosphere or the halide vapor may be condensed in one of two or more condensers which alternately are used as halide evaporator.

The following examples for the working of the process are given:

Example I

A tower fitted with crystalline high alumina was used as reaction chamber, the aluminium being kept as liquid or molten droplets on the alumina and moving slowly from the top to the bottom. The tower was brought up to the desired temperatures by electric currents induced in a shell of low carbon iron. The bottom end of the tower was connected with an halide evaporator containing the halide to be used and electrically heated, and its top end was connected with a condenser water cooled at its top end and connected with a vacuum pump. The aluminium usually condenses in a zone near the reaction chamber at a temperature estimated to be about 700° C., whereas the halide used condenses in the water-cooled zone of the condenser. The residual pressure was in every case less than 0.5 m. m. mercury and mostly considerably less. The time of distillation was between one and four hours.

In a series of experiments made in this apparatus, the aluminium bearing material was impure aluminium containing Cu 3.36%, Ni 0.75%, Fe 1.28%, Si 1.74%, Mn 0.35%: but the impurities in the distillate averaged Cu less than 0.05%, Fe less than 0.06%, Si less than 0.04%, manganese trace to 0.05%. The halide used was aluminium chloride evaporated at about 120° C. When the temperature of the reaction tower was kept at 900 to 1000° C. the ratio of the weight of aluminium chloride having passed through the aluminium bearing material to the aluminium distilled was about 2.5 to 2.6 rising to about 2.8 to 3.0 when the reaction temperature was lowered to about 800° C. and becoming more unfavourable to values between 4 and 7 when the reaction temperature was reduced to about 700° C. or when the evaporation temperature of the aluminium chloride was raised to 130° C. or more.

With $AlBr_3$ in the same apparatus aluminium was distilled with the halide evaporator maintained at about 100° C. and the reaction tower at about 1000° C.

Example II

In another series of experiments in a similar apparatus aluminium silicon containing Si 46.6% was used as aluminium bearing material. It was introduced into the reaction chamber as a coarse powder and no supporting material was employed. $AlCl_3$ evaporated at about 120° C. was used as the halide. The distillate in all cases contained less than 0.08% silicon. The ratio of the weight of the aluminium chloride to the weight of the aluminium distilled averaged 2.7 at reaction temperatures round about 930° C. and rose to values of about 7 and higher at temperatures of 830° C. and lower.

Example III

In a third series of experiments, ferro-aluminium of various compositions was used. These materials were brought into the reaction chamber as a coarse powder, no supporting material being employed. The figures given below were obtained using aluminium chloride as the halide and an evaporation temperature of 120° C.

When ferro-aluminium containing 45.2% iron and consisting mainly of the compound $Al_5Fe_2$ or the compounds $Al_3Fe$ and $Al_2Fe$ was brought into reaction with the aluminium chloride vapour at about 950° C., about 2.5 to 2.7 parts of aluminium chloride had to be passed through the ferro-aluminium in order to distil one part of aluminium whereas at about 830° C. approximately 8 parts $AlCl_3$ had to be distilled for one part aluminium under the given conditions. The iron content of the distillate was of the order of 0.1% or less.

When ferro-aluminium containing 71.4% iron and mainly consisting of the compound $AlFe$ was brought into the reaction chamber at about 1000° C. the ratio of aluminium chloride to aluminium distilled was about 2.5 to 2.7; at about 950° C. the ratio was between 3 and 8 dependent on and decreasing with the height of the ferro-aluminium column; and a temperature of 800° C. (with this aluminium bearing material) proved too low for satisfactory distillation.

What I claim is:

1. A process for obtaining aluminium as a distillate from material bearing the same, which comprises evaporating a halide of the class consisting of fluoride, chloride and bromide, contacting and reacting the halide vapour in an unsaturated condition with said material at elevated temperature whereby to volatilize the aluminium by a strongly endothermic reaction as unstable aluminium halogen compound vapours, said temperature, under the prevailing pressure, being below the temperature of direct evaporation of the aluminium from said material but high enough to enable said strongly endothermic reaction leading to the formation of the unstable compound vapours to proceed, and converting said unstable vapours into aluminium and a stable halide by cooling said vapours to condense aluminium in the metallic state.

2. A process according to preceding claim 1 in which the temperature of reaction is higher than the temperature at which the halide is evaporated.

3. A process according to the preceding claim 1 wherein the reaction between the halide vapour and the aluminium bearing material is carried out under partial vacuum.

4. A process according to the preceding claim 1 in which the temperature of reaction is higher than the temperature at which the halide is evaporated and the reaction between the halide vapour and the aluminium bearing material is carried out under partial vacuum.

5. A process according to the preceding claim 1 in which the halide used is a low boiling or subliming halide.

6. A process according to the preceding claim 1 wherein the reaction between the halide vapour and the aluminium bearing material is effected in the presence of a gas inert to aluminium.

7. A process according to the preceding claim 1 wherein the aluminium is condensed from the said compound vapours at a temperature above the condensation temperature of the halide vapour and is thus separated from the halide.

8. A process according to the preceding claim 1 wherein the aluminium is condensed from the said compound vapours above the condensation temperature of the halide vapour, and the halide vapour recirculates into contact with the aluminium bearing material from which further aluminium is volatilized.

9. A process according to the preceding claim 1 wherein the aluminium and the halide are separately condensed from the aluminium halogen compound vapour.

10. A process according to the preceding claim 1 wherein the aluminium and the halide are separately condensed from the aluminium halogen compound vapour and wherein the condensed halide is re-evaporated without discontinuing the distillation of aluminium.

11. A process according to the preceding claim 1 wherein the aluminium bearing material is brought into a dispersed condition, presenting a high specific area.

12. A process for producing aluminium as a distillate from aluminium bearing alloys containing a high proportion of other metals which comprises evaporating a halide of the class consisting of fluoride, chloride and bromide, contacting and reacting the halide vapour in an unsaturated condition with said material at elevated temperature whereby to volatilize the aluminium by a strongly endothermic reaction as unstable aluminium halogen compound vapours, said temperature, under the prevailing pressure, being below the temperature of direct evaporation of the aluminium from said material but high enough to enable said strongly endothermic reaction leading to the formation of the unstable compound vapours to proceed, and converting said unstable vapours into aluminium and a stable halide by cooling said vapours to condense aluminium in the metallic state.

13. A process for producing aluminium as a distillate from an aluminium compound of the class consisting of ferro-aluminium and aluminium carbide, which comprises evaporating a halide of the class consisting of fluoride, chloride and bromide, contacting and reacting the halide vapour in an unsaturated condition with said material at elevated temperature whereby to volatilize the aluminium by a strongly endothermic reaction as unstable aluminium halogen compound vapours, said temperature, under the prevailing pressure, being below the temperature of direct evaporation of the aluminium from said material but high enough to enable said strongly endothermic reaction leading to the formation of the unstable compound vapours to proceed, and converting said unstable vapours into aluminium and a stable halide by cooling said vapours to condense aluminium in the metallic state.

14. A process for producing aluminium as a distillate from aluminium bearing alloys containing a high proportion of other metals, which comprises evaporating a halide of the class consisting of fluoride, chloride and bromide, contacting and reacting the halide vapour in an unsaturated condition with said material at elevated temperature and under partial vacuum whereby to volatilize the aluminium by a strongly endothermic reaction as unstable aluminium halogen compound vapours, said temperature, under said partial vacuum, being below the temperature of direct evaporation of the aluminium from said material but high enough to enable the strongly endothermic reaction leading to the formation of the unstable compound vapours to proceed, and converting said unstable vapours into aluminium and a stable halide by cooling said vapours to condense aluminium in the metallic state.

15. A process for producing aluminium as a distillate from an aluminium compound of the class consisting of ferro-aluminium and aluminium carbide, which comprises evaporating a halide of the class consisting of fluoride, chloride and bromide, contacting and reacting the halide vapour in an unsaturated condition with said material at elevated temperature and under partial vacuum whereby to volatilize the aluminium by a strongly endothermic reaction as unstable aluminium halogen compound vapours, said temperature, under said partial vacuum, being below the temperature of direct evaporation of the aluminium from said material but high enough to enable said strongly endothermic reaction leading to the formation of the unstable compound vapours to proceed, and converting said unstable vapours into aluminium and a stable halide by cooling said vapours to condense aluminium in the metallic state.

16. A process for refining aluminium by distillation from impure aluminium, which comprises evaporating a halide of the class consisting of fluoride, chloride and bromide, contacting and reacting the halide vapour in an unsaturated condition with said material at elevated temperature and under partial vacuum whereby to volatilize the aluminium by a strongly endothermic reaction as unstable aluminium halogen compound vapours, said temperature, under said partial vacuum, being below the temperature of direct evaporation of the aluminium from said material but high enough to enable said strongly endothermic reaction leading to the formation of the unstable compound vapours to proceed, and converting said unstable vapours into aluminium and a stable halide by cooling said vapours to condense aluminium in the metallic state.

PHILIPP GROSS.

(References on following page)

REFERENCES CITED

The following references are of record in the file of this patent:

UNITED STATES PATENTS

| Number | Name | Date |
|---|---|---|
| 1,636,881 | Tullis | July 26, 1927 |
| 2,184,705 | Willmore | Dec. 26, 1939 |
| 2,236,234 | Hanak | Mar. 25, 1941 |

FOREIGN PATENTS

| Number | Country | Date |
|---|---|---|
| 604,697 | Germany | Oct. 26, 1932 |
| 607,561 | Germany | Oct. 26, 1932 |